US011360230B2

(12) United States Patent
Li et al.

(10) Patent No.: US 11,360,230 B2
(45) Date of Patent: Jun. 14, 2022

(54) SYSTEM AND METHOD FOR FULL WAVEFORM INVERSION OF SEISMIC DATA WITH REDUCED COMPUTATIONAL COST

(71) Applicant: Chevron U.S.A. Inc., San Ramon, CA (US)

(72) Inventors: Siwei Li, Houston, TX (US); Guojian Shan, Sugar Land, TX (US); Yue Wang, Sugar Land, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 168 days.

(21) Appl. No.: 16/705,013

(22) Filed: Dec. 5, 2019

(65) Prior Publication Data

US 2021/0173109 A1  Jun. 10, 2021

(51) Int. Cl.
*G01V 1/36* (2006.01)
*G01V 1/28* (2006.01)
*G01V 1/30* (2006.01)
*G06F 17/16* (2006.01)

(52) U.S. Cl.
CPC .............. *G01V 1/368* (2013.01); *G01V 1/282* (2013.01); *G01V 1/306* (2013.01); *G06F 17/16* (2013.01)

(58) Field of Classification Search
CPC ......... G01V 1/368; G01V 1/282; G01V 1/306
See application file for complete search history.

(56) References Cited

U.S. PATENT DOCUMENTS

| 5,583,825 A * | 12/1996 | Carrazzone ............ G01V 1/306 367/31 |
| 5,588,032 A | 12/1996 | Johnson et al. |
| 6,005,916 A | 12/1999 | Johnson et al. |
| 7,841,982 B2 | 11/2010 | Johnson et al. |
| 8,246,543 B2 | 8/2012 | Johnson et al. |
| 8,571,287 B2 | 10/2013 | DeMan et al. |

(Continued)

FOREIGN PATENT DOCUMENTS

| CN | 106908835 B | 6/2018 |
| EP | 2056124 B1 | 5/2011 |

(Continued)

OTHER PUBLICATIONS

Bjorn Engquist et al., "Seismic Imaging and Optimal Transport," Https://arXiv:1808.04801v1 [math.NA] Aug. 14, 2018.

(Continued)

*Primary Examiner* — Elias Desta
(74) *Attorney, Agent, or Firm* — Marie L. Clapp

(57) ABSTRACT

A method is described for seismic inversion including receiving a processed seismic image and an enhanced seismic image representative of a subsurface volume of interest; forward modeling the processed seismic image and the enhanced seismic image to generate a first modeled dataset and a second modeled dataset; differencing the first modeled dataset and the second modeled dataset to create a residual dataset; filtering the first modeled dataset to generate an approximation of illumination; preconditioning the residual dataset with the approximation of illumination to generate an adjoint source; back projecting the adjoint source to determine a model update; and applying the model update to an earth model of the subsurface volume of interest.

7 Claims, 7 Drawing Sheets

(56) References Cited

U.S. PATENT DOCUMENTS

| | | | |
|---|---|---|---|
| 8,729,903 | B2 | 5/2014 | Srnka et al. |
| 9,013,956 | B2 | 4/2015 | Hill |
| 9,470,811 | B2 | 10/2016 | Sun et al. |
| 9,476,996 | B2 | 10/2016 | Pica et al. |
| 9,482,770 | B2 | 11/2016 | Sun |
| 9,529,109 | B2 | 12/2016 | Bennett et al. |
| 9,600,775 | B2 | 3/2017 | Coles et al. |
| 9,702,997 | B2 | 7/2017 | Sava et al. |
| 9,779,502 | B1 | 10/2017 | Lovberg et al. |
| 9,857,489 | B2 | 1/2018 | Lambare et al. |
| 9,973,246 | B2 | 5/2018 | Forenza et al. |
| 9,977,141 | B2 | 5/2018 | Liu |
| 10,175,350 | B1 | 1/2019 | Tsokos et al. |
| 10,234,581 | B2 | 3/2019 | Hu |
| 10,345,464 | B2 * | 7/2019 | Guillaume ............. G01V 1/303 |
| 10,871,584 | B2 | 12/2020 | Jiao |
| 10,942,286 | B2 | 3/2021 | Albertin |
| 10,983,234 | B2 * | 4/2021 | Turquais .............. G01V 1/3808 |
| 11,048,001 | B2 * | 6/2021 | Zhang .................... G01V 1/282 |
| 2011/0131020 | A1 | 6/2011 | Meng |
| 2013/0311149 | A1 | 11/2013 | Tang et al. |
| 2019/0064377 | A1 | 2/2019 | Albertin |

FOREIGN PATENT DOCUMENTS

| | | |
|---|---|---|
| EP | 2638415 A2 | 9/2013 |
| WO | 2018031113 A1 | 2/2018 |
| WO | 2018102043 A1 | 6/2018 |
| WO | 2018175013 A1 | 9/2018 |
| WO | 2019186286 A1 | 10/2019 |

OTHER PUBLICATIONS

J.C. Shragge et al., "4D Seismic Wave-equation Depth Migration Velocity Inversion," Conference Proceedings, 74th EAGE Conference and Exhibition incorporating EUROPEC 2012, Jun. 2012.

P. Sava et al., "Wave-Equation Migration Velocity Analysis. II. Subsalt Imaging Examples," European Association of Seoscientists & Engineers, Geophysical Prospecting, 2004, 52, 607-623.

PCT International Search Report and Written Opinion, dated Nov. 12, 2020, issued in International Application No. PCT/IB2020/057345, filed Aug. 4, 2020, 13 pages.

PCT International Search Report and Written Opinion, dated Feb. 25, 2021, issued in International Application No. PCT/IB2020/061126, filed Nov. 25, 2020, 11 pages.

Q. Liu et al. , "Seismic Imaging: From Classical to Adjoint Tomography," Tectonophysics, vol. 566-567, 2012, pp. 31-66, Elsevier.

* cited by examiner

SYSTEM AND METHOD FOR FULL WAVEFORM INVERSION OF SEISMIC DATA WITH REDUCED COMPUTATIONAL COST

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for inverting seismic data to generate a velocity model of a subsurface reservoir and, in particular, to a method of inverting seismic data that compensates for poor illumination of the subsurface due to complex geology.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. Seismic data may also be inverted to generate a velocity model of the subsurface volume of interest. In some geologically complex areas, the differences in density of different geobodies (rock formations, salt bodies, etc.) will result in high levels of reflection, attenuation, and/or turning of the seismic energy. This will result neighboring regions that are not well sampled by the seismic energy. These neighboring areas are referred to as being poorly illuminated. Poor illumination negatively impacts both seismic imaging and seismic inversion.

The ability to define the location of rock and fluid property changes in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for improved seismic inversion which will improve seismic images that will allow better seismic interpretation of potential hydrocarbon reservoirs.

SUMMARY

In accordance with some embodiments, a method of seismic inversion including receiving a processed seismic image and an enhanced seismic image representative of a subsurface volume of interest; forward modeling the processed seismic image and the enhanced seismic image to generate a first modeled dataset and a second modeled dataset; differencing the first modeled dataset and the second modeled dataset to create a residual dataset; filtering the first modeled dataset to generate an approximation of illumination; preconditioning the residual dataset with the approximation of illumination to generate an adjoint source; back projecting the adjoint source to determine a model update; and applying the model update to an earth model of the subsurface volume of interest is disclosed. The method may repeat the steps using the updated earth model until the residual dataset is sufficiently small.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Figure 1:
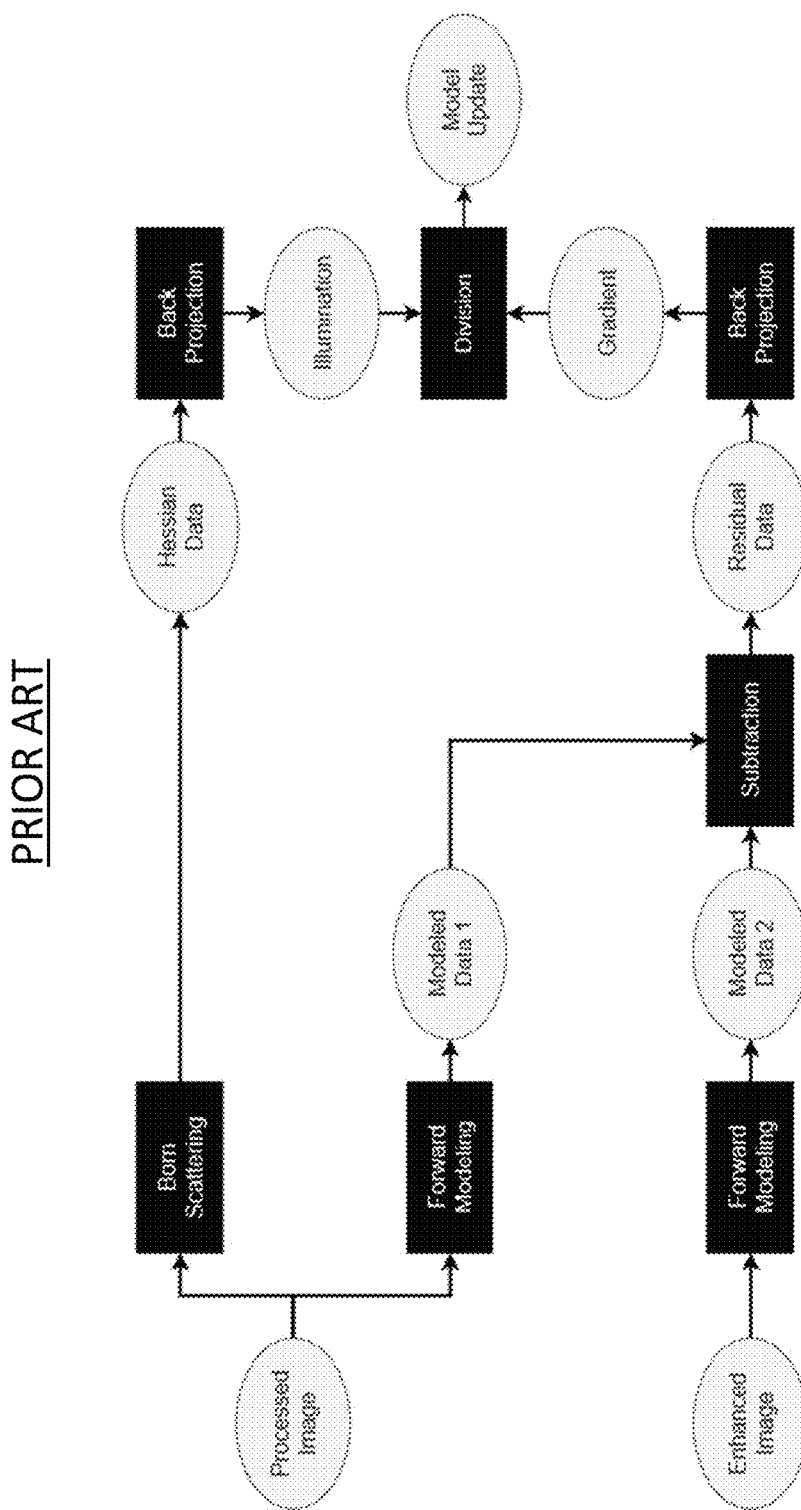
FIG. 1 illustrates a flowchart of a prior art method of full waveform inversion.

Described below are methods, systems, and computer readable storage media that provide a manner of seismic inversion. These embodiments are designed to be of particular use for full waveform inversion of subsurface volumes in geologically complex areas.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Advantageously, those of ordinary skill in the art will appreciate, for example, that the embodiments provided herein may be utilized to generate a more accurate digital seismic image (i.e., the corrected digital seismic image) based on the more accurate earth model generated by the seismic inversion. The more accurate digital seismic image may improve hydrocarbon exploration and improve hydrocarbon production. The more accurate digital seismic image may provide details of the subsurface that were illustrated poorly or not at all in traditional seismic images. Moreover, the more accurate digital seismic image may better delineate where different features begin, end, or any combination thereof. As one example, the more accurate digital seismic image may illustrate faults and/or salt flanks more accurately. As another example, assume that the more accurate digital seismic image indicates the presence of a hydrocarbon deposit. The more accurate digital seismic image may delineate more accurately the bounds of the hydrocarbon deposit so that the hydrocarbon deposit may be produced.

Those of ordinary skill in the art will appreciate, for example, that the more accurate digital seismic image may be utilized in hydrocarbon exploration and hydrocarbon production for decision making. For example, the more accurate digital seismic image may be utilized to pick a location for a wellbore. Those of ordinary skill in the art will appreciate that decisions about (a) where to drill one or more wellbores to produce the hydrocarbon deposit, (b) how many wellbores to drill to produce the hydrocarbon deposit, etc. may be made based on the more accurate digital seismic image. The more accurate digital seismic image may even be utilized to select the trajectory of each wellbore to be drilled. Moreover, if the delineation indicates a large hydrocarbon deposit, then a higher number of wellbore locations may be selected and that higher number of wellbores may be drilled, as compared to delineation indicating a smaller hydrocarbon deposit.

Those of ordinary skill in the art will appreciate, for example, that the more accurate digital seismic image may be utilized in hydrocarbon exploration and hydrocarbon production for control. For example, the more accurate digital seismic image may be utilized to steer a tool (e.g., drilling tool) to drill a wellbore. A drilling tool may be steered to drill one or more wellbores to produce the hydrocarbon deposit. Steering the tool may include drilling around or avoiding certain subsurface features (e.g., faults, salt diapirs, shale diapirs, shale ridges, pockmarks, buried channels, gas chimneys, shallow gas pockets, and slumps), drilling through certain subsurface features (e.g., hydrocarbon deposit), or any combination thereof depending on the desired outcome. As another example, the more accurate digital seismic image may be utilized for controlling flow of fluids injected into or received from the subsurface, the wellbore, or any combination thereof. As another example, the more accurate digital seismic image may be utilized for controlling flow of fluids injected into or received from at least one hydrocarbon producing zone of the subsurface. Chokes or well control devices, positioned on the surface or downhole, may be used to control the flow of fluid into and out. For example, certain subsurface features in the more accurate digital seismic image may prompt activation, deactivation, modification, or any combination thereof of the chokes or well control devices so as control the flow of fluid. Thus, the more accurate digital seismic image may be utilized to control injection rates, production rates, or any combination thereof.

Those of ordinary skill in the art will appreciate, for example, that the more accurate digital seismic image may be utilized to select completions, components, fluids, etc. for a wellbore. A variety of casing, tubing, packers, heaters, sand screens, gravel packs, items for fines migration, etc. may be selected for each wellbore to be drilled based on the more accurate digital seismic image. Furthermore, one or more recovery techniques to produce the hydrocarbon deposit may be selected based on the more accurate digital seismic image.

In short, those of ordinary skill in the art will appreciate that there are many decisions (e.g., in the context of (a) steering decisions, (b) landing decisions, (c) completion decisions, (d) engineering control systems and reservoir monitoring in the following but not limited to: Tow Streamer, Ocean Bottom Sensor, VSP, DASVSP, and imaging with both primaries and free surface multiple, etc.) to make in the hydrocarbon industry and making proper decisions based on more accurate digital seismic images should improve the likelihood of safe and reliable operations. For simplicity, the many possibilities, including wellbore location, component selection for the wellbore, recovery technique selection, controlling flow of fluid, etc., may be collectively referred to as managing a subsurface reservoir.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Seismic imaging is considered key to reducing risk in exploration and development operations. Accurate imaging requires an accurate earth model. The earth model may include, for example, parameters of P-wave velocity ($V_P$), S-wave velocity ($V_S$), density ($\rho$), anisotropy, and the like. The earth model may be estimated through a number of processes known to those of skill in the art such as semblance analysis and various ray-based and waveform-based inversions including full waveform inversion. FIG. 1 illustrates a prior art method of full waveform inversion called waveform inversion by relative data matching (WIRDM). WIRDM is a seismic velocity model building tool that aims at improving image focus and gather flatness through iteratively updating the model based on mis-matches in the observed and synthesized (modeled or synthetic) waveforms. WIRDM is advantageous over conventional ray-based methods because it honors the bandlimited nature of seismic signals. Moreover, it is less vulnerable to cycle-skipping problem that hinders successful field application of many waveform-based inversion approaches.

For a cost-effective implementation of WIRDM in 3D large-scale production, both the computation of a single iteration and the number of iterations for convergence contribute to the overall project cycle. In complex geological areas such as deep-water Gulf of Mexico, the reservoir overburden, such as salt bodies, often creates non-trivial illumination problems for seismic surveys. WIRDM is challenged by these illumination problems. If not compensated correctly, WIRDM encounters trouble in rendering model resolution, particularly in the vertical direction, and encounters local minimum at early stage of inversion. In the worst scenario, insufficiently compensated illumination can overwhelmingly mislead WIRDM away from the correct model update direction.

The prior art solution of FIG. 1 attempts to address illumination by leveraging the Hessian (i.e., Hessian matrix, a square matrix of second-order partial derivatives of a scalar-valued function) during WIRDM. The Hessian of WIRDM can be considered as a matrix in its discretized algorithmic form. It has a very large condition number and is very expensive for storage and application. The diagonal elements of Hessian are mainly responsible for illumination, which represents relative amplitude between waves from one source, reflected at a particular geological layer underground and then received as signal at sensors. It is possible to compute such illumination by extended Born modeling, however this will require significantly additional costs. Depending on the form and approximation adopted for Hessian, the algorithm would require additional computations of the Hessian within each inversion iteration and/or extra computer memory/disk usages. For example, as shown in FIG. 1, through Born scattering one could synthesize data by perturbing the model. Afterwards, this synthetic data might be back-projected to model space in a similar fashion as data residual to sample entries of the Hessian. However, the computation and hardware costs associated with Hessian are non-trivial and usually impractical or unstable for 3D large-scale production applications as is needed for hydrocarbon exploration. Additionally, both the Born scattering and the back projection operations are computationally demanding and the division operation is numerically unstable and difficult to tune for best performance.

Figure 2:
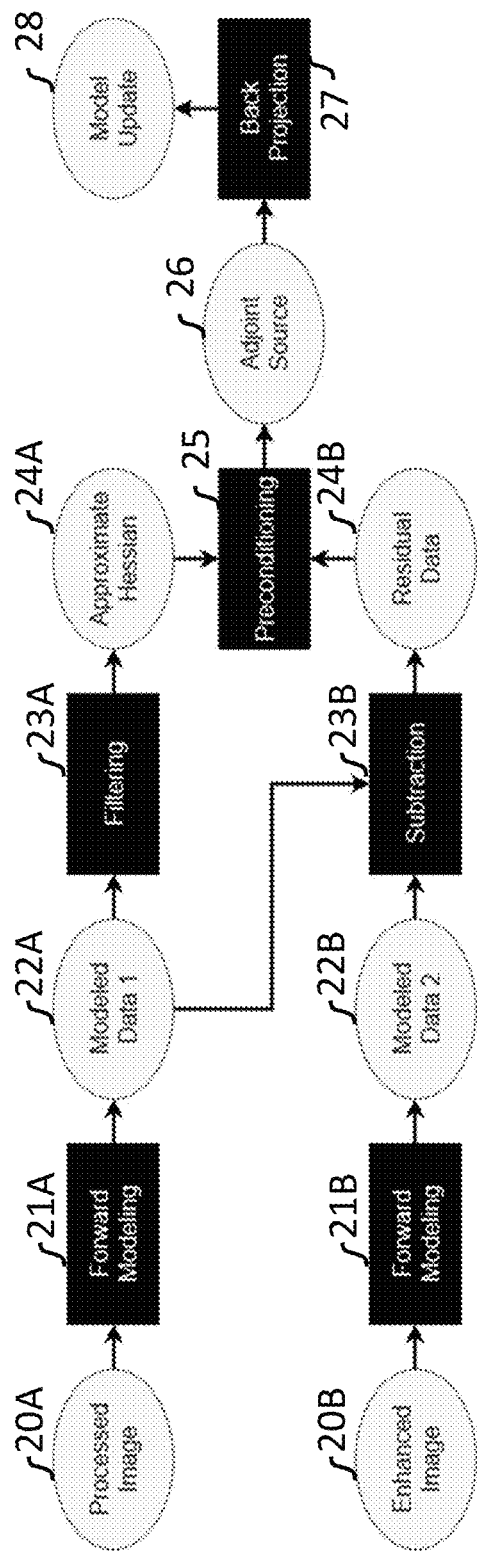
FIG. 2 illustrates a flowchart of a method of full waveform inversion with illumination compensation, in accordance with some embodiments.
Figure 3:
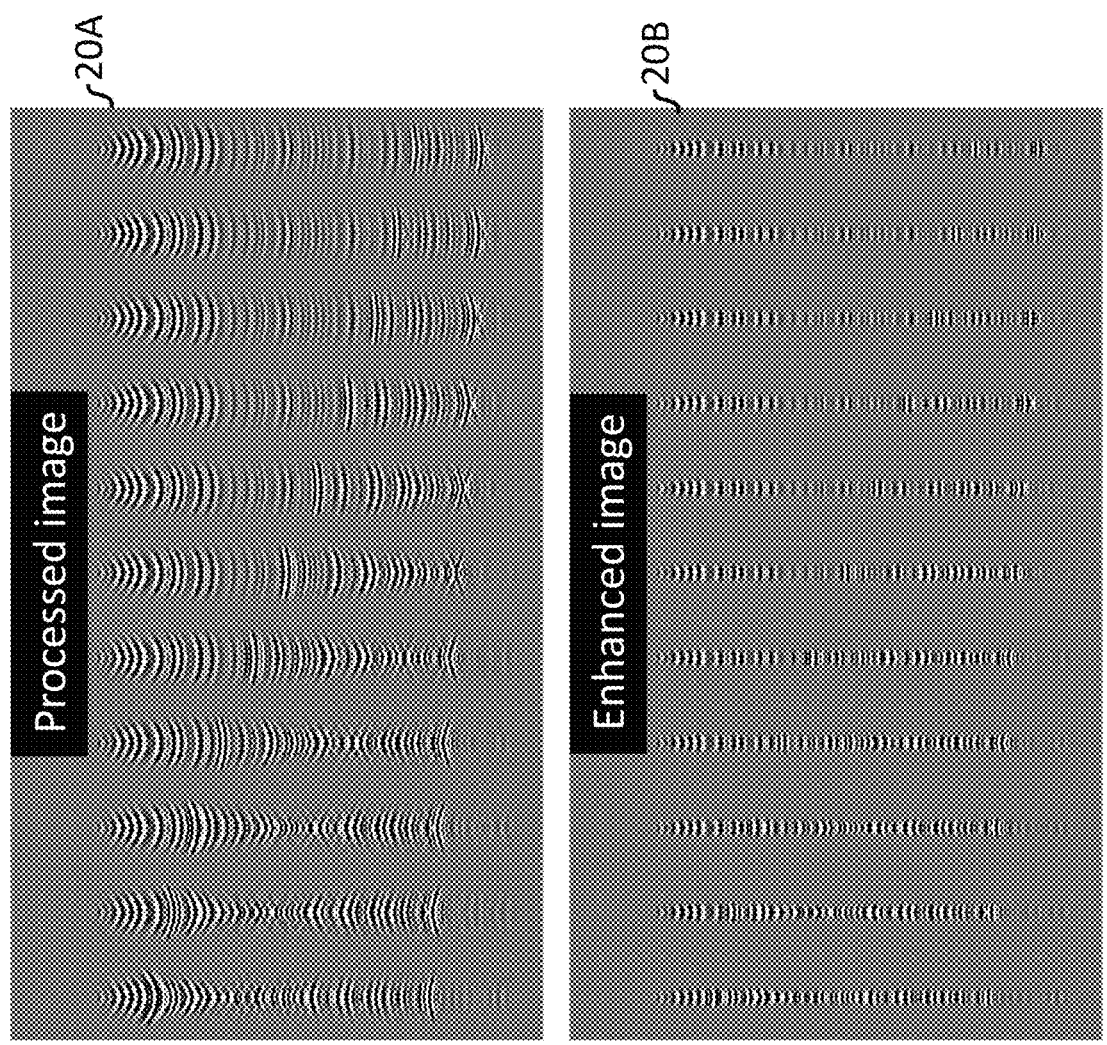
FIG. 3 shows examples of steps of the method, in accordance with some embodiments.

FIG. 2 illustrates a flowchart of a method 100 for seismic inversion of a complex subsurface volume of interest designed to reduce computational cost. The inputs to the method 100 are a processed image 20A and an enhanced image 20B. The processed image 20A is a seismic image that may have been processed by applying denoising, amplitude balancing, and other filtering. As is known to those of skill in the art, there are many techniques for improving a seismic image by attenuating noise and improving amplitude content. For example, a mask or mute may be applied to part of the gathers, in the time/depth dimension or a spatial dimension or some combination thereof, to limit the image gathers to selected reflectors that are believed to be of significance for identification of a potential hydrocarbon reservoir. The enhanced image 20B is the same seismic image with enhancements to improve focusing of seismic events in the image gathers such as, for example, by attenuating amplitudes at non-zero lag by applying a taper. FIG. 3 shows an example of processed images 20A and enhanced images 20B.

At operation 21A and operation 21B, the processed image 20A and the enhanced image 20B are subjected to the same type of forward modeling, for example extended Born modeling. This generates modeled data 1 22A and modeled data 2 22B. The modeled data 1 22A and modeled data 2 22B are subtracted 23B (i.e., differenced, meaning modeled data 1 22A may be subtracted from modeled data 2 22B or modeled data 2 22B may be subtracted from modeled data 1 22A) on a point-by-point basis throughout the volume of the modeled data to generate residual data 24B. Residual data 24B has the same dimensionality as modeled data 1 22A and modeled data 2 22B.

Additionally, modeled data 1 22A is subjected to filtering 23A. The filtering 23A generates an approximate Hessian 24A that represents the diagonal elements of the Hessian.

$$G_1 \approx \sum_s \sum_t \frac{J^T \cdot (p - p_0)}{J^T \cdot J \cdot I} \quad \text{PRIOR ART}$$

$$G_2 \approx \sum_s \sum_t J^T \cdot \left|\frac{\partial p}{\partial t}\right|^{-1} (p - p_0) \quad \text{Present invention}$$

Here symbol J stands for extended Born modeling and $J^T$ is its adjoint, i.e. back projection. Both J and $J^T$ are computationally expensive yet similar. Symbol G is the model update. $G_1$ represents 'prior art' where we must apply two $J_S$ and one $J^T$ per iteration. In contrast, the new methodology requires only one $J^T$. Comparing $G_2$ against $G_1$ and considering the fact that we still need two $J_S$ for forward modeling of p and $p_0$ in both cases, the present invention reduces the computational cost to 60% of the prior art method. To simplify expression, we have used inverse of partial derivative of p with respect to t in $G_2$ to represent "Filtering" in (FIG. 2 23A) and its multiplication with $(p-p_0)$ for "Preconditioning" (FIG. 2 25). The approximate Hessian 24A can be implemented as preconditioning 25 applied to the residual data 24B in order to find the adjoint source 26. Adjoint source 26 is the preconditioned residual data that is used by back projection 27 to create the model update 28. The model update 28 is applied to the current model which is then used for another iteration of the method 100.

Once method 100 has been iterated over until the residual data 24B is sufficiently small, for example below a threshold, or when the processed image 20A is sufficiently focused, the updated velocity model can be used for seismic imaging to produce an improved seismic image. When interpreting a seismic image, seismic horizons are identified and traced throughout the subsurface volume of interest. Oftentimes, this volume of interest is near or below salt bodies because salt provides a good trap for potential hydrocarbon reservoirs but such areas suffer from poor illumination. Improving the resolutions of events near or below salt allows better interpretation. This may impact hydrocarbon reservoir delineation and well planning.

Figure 4:
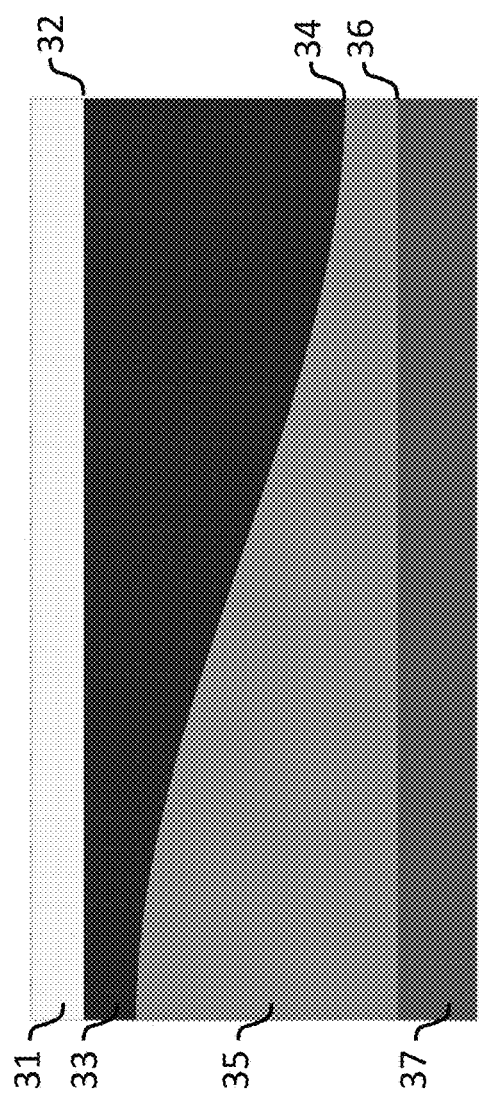
FIG. 4 shows an example earth model.

A comparison of the prior art method of FIG. 1 and the present invention method 100 is demonstrated by FIG. 4-FIG. 8. FIG. 4 is a 2-D synthetic velocity model wherein the gray level indicates the seismic velocities of each layer. FIG. 4 shows a water layer 31 overlaying an upper rock formation 33, a lower rock formation 35, and a basement rock formation 37. These are separated by water bottom 32, formation interface 34, and basement interface 36. Although FIG. 4 doesn't show the density model for this synthetic earth model, the density varies in thin flat layers.

Figure 5:
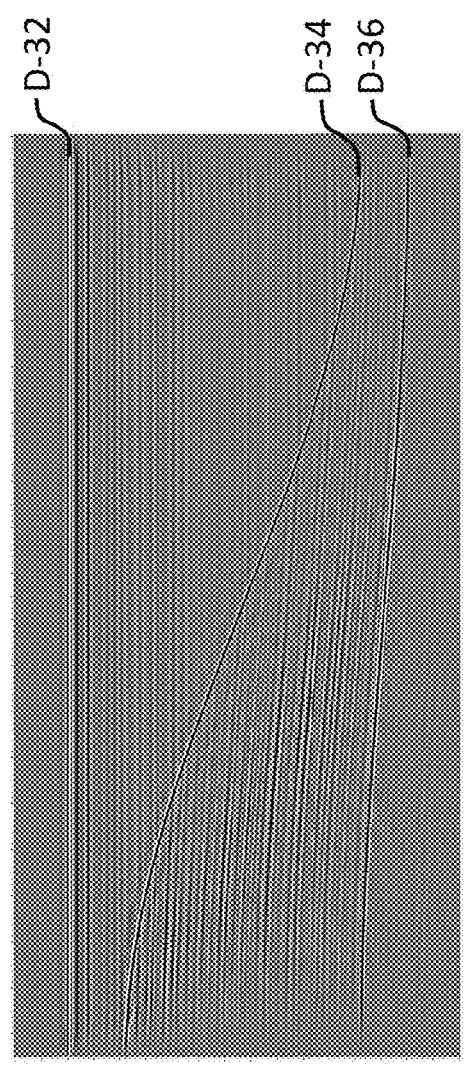
FIG. 5 shows synthetic data for the example earth model.

FIG. 5 shows a seismic image generated from seismic data forward modeled through the synthetic earth model. In this example, an incorrect velocity model was used during the seismic imaging (upper rock formation 33 and lower rock formation 35 were represented by incorrect velocities).

The water bottom event D-32 is positioned correctly and is flat. However, due to the incorrect velocity model, the formation interface event D-34 and basement interface event D-36 are not positioned correctly. For basement interface event D-36 particularly, it is possible to see that it is not flat as it should be. Additionally, the thin flat layers generated by the density variation also show curvature that increases with depth.

Figure 6:
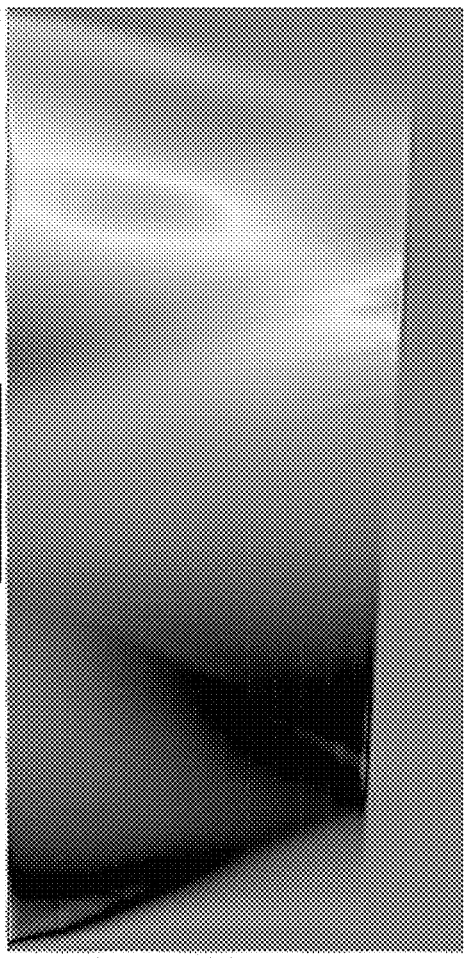
FIG. 6 illustrates the result of a step of the prior art method of FIG. 1.

The seismic image of FIG. 5 was used as input for the prior art method of FIG. 1. The gradient calculated during the WIRDM process is shown in FIG. 6.

Figure 7:
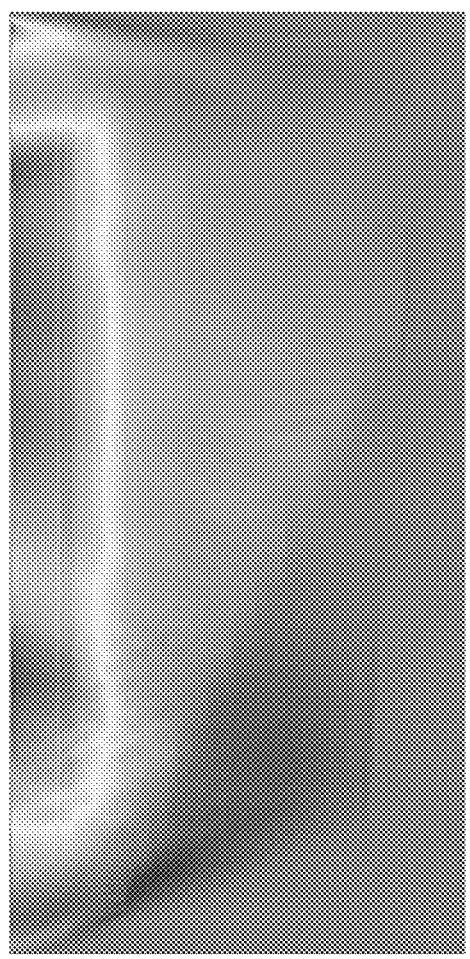
FIG. 7 illustrates the result of a step of the method of FIG. 2.
Figure 8:
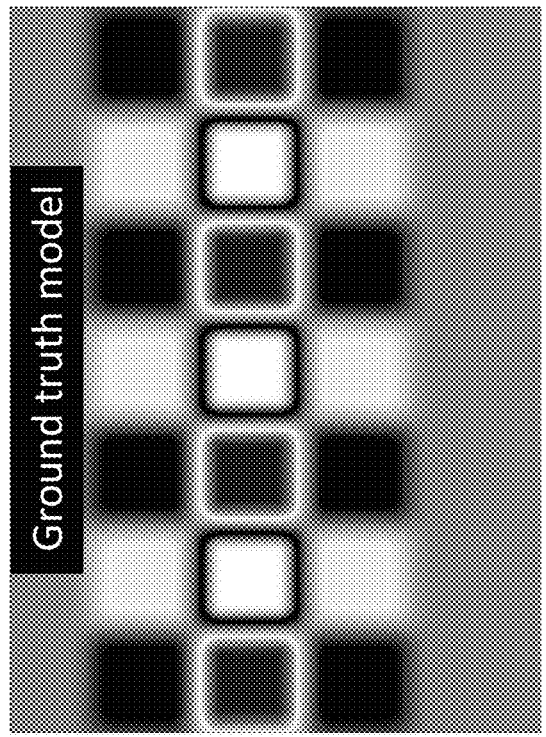
FIG. 8 compares results of a prior art method and the method of full waveform inversion with illumination compensation, in accordance with some embodiments.
Figure 8:
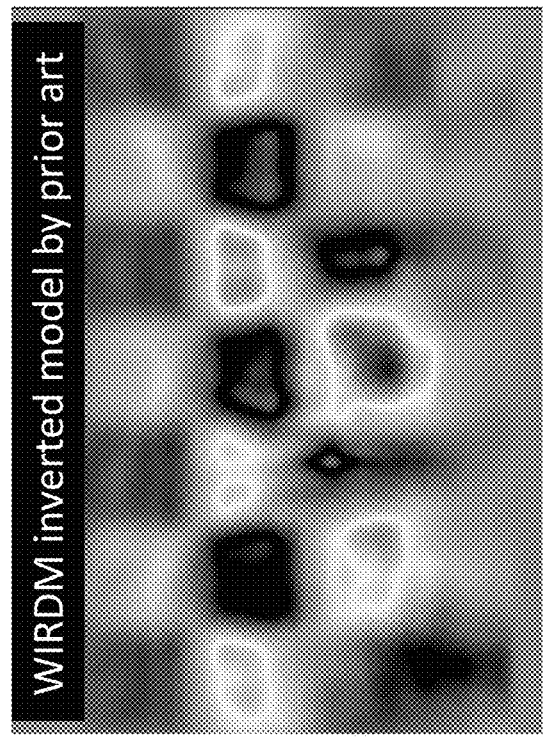
Figure 8:
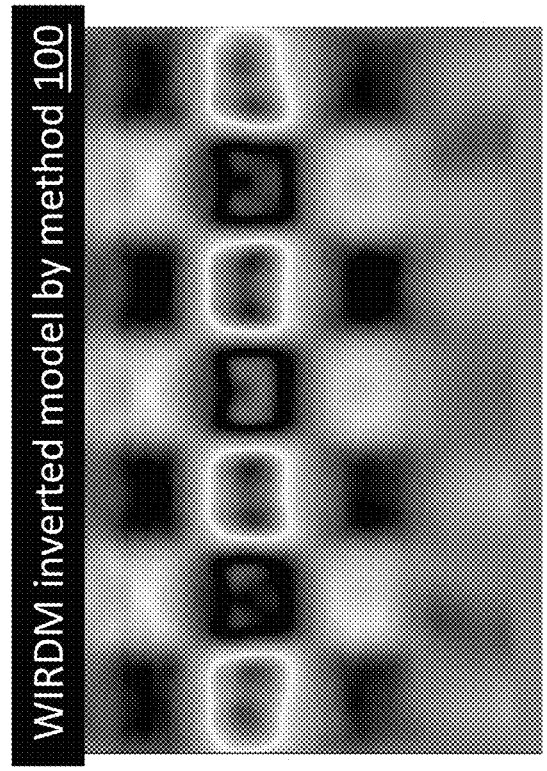

The seismic image of FIG. 5 was also used as input for method 100 of FIG. 2. FIG. 7 shows the gradient calculated. It has improved spatial amplitude, especially vertically, which means that the gradient was pointing in a model update direction with less bias due to illumination and is therefore more constructive for inversion convergence FIG. 8 shows another example comparing the result of the prior art method of FIG. 1 with the result of an embodiment of method 100. In FIG. 8, the ground truth model is shown at the top. The result of method 100 is shown in the lower left. The result of the prior art method is shown in the lower right.

Figure 9:
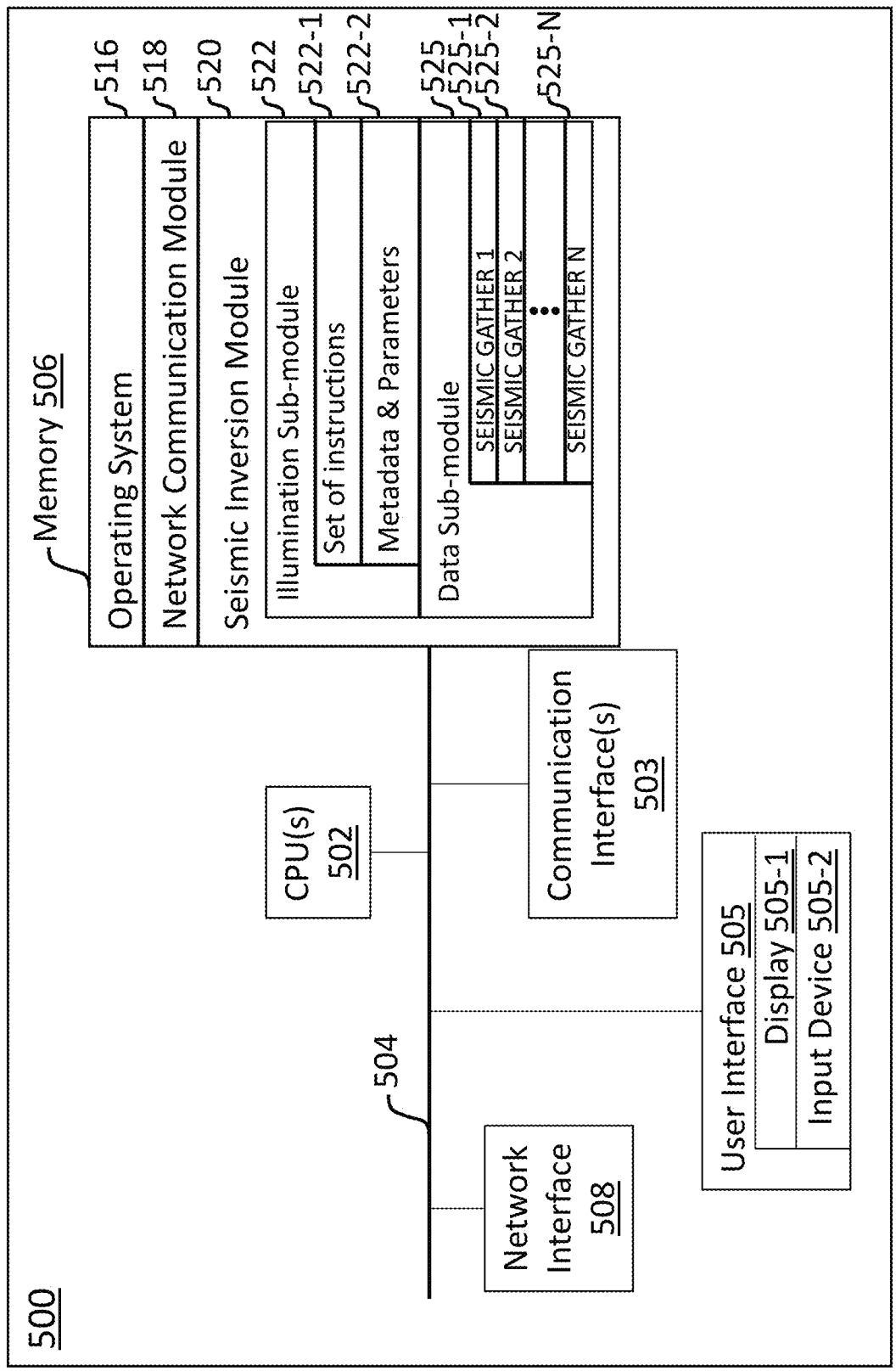
FIG. 9 is a block diagram illustrating a seismic imaging system, in accordance with some embodiments.

FIG. 9 is a block diagram illustrating a seismic inversion system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic inversion system 500 includes one or more processing units (CPUs) 502, one or more network interfaces 508 and/or other communications interfaces 503, memory 506, and one or more communication buses 504 for interconnecting these and various other components. The seismic inversion system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a seismic inversion module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the seismic inversion module 520 executes the operations of method 100. Seismic inversion module 520 may include data sub-module 525, which handles the seismic dataset including seismic gathers 525-1 through 525-N. This seismic data is supplied by data sub-module 525 to other sub-modules.

Illumination sub-module 522 contains a set of instructions 522-1 and accepts metadata and parameters 522-2 that will enable it to execute operations of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 9) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of seismic inversion, comprising:
   a. receiving, at a computer processor, a processed seismic image and an enhanced seismic image representative of a subsurface volume of interest;
   b. forward modeling, via the computer processor, the processed seismic image and the enhanced seismic image to generate a first modeled dataset and a second modeled dataset;
   c. differencing, via the computer processor, the first modeled dataset and the second modeled dataset to create a residual dataset;
   d. filtering, via the computer processor, the first modeled dataset to generate an approximation of illumination;
   e. preconditioning, via the computer processor, the residual dataset with the approximation of illumination to generate an adjoint source;
   f. back projecting, via the computer processor, the adjoint source to determine a model update; and
   g. applying the model update to an earth model of the subsurface volume of interest.

2. The method of claim 1 further comprising using the earth model for seismic imaging.

3. The method of claim 1 wherein the approximation of illumination is an approximation of a Hessian matrix.

4. The method of claim 1 further comprising repeating steps b-g until the residual dataset contains values below a threshold wherein the threshold may be a user-supplied parameter or determined by the computer processor.

5. The method of claim 1 wherein the subsurface volume of interest includes regions of poor seismic illumination.

6. A computer system, comprising:
   one or more processors;
   memory; and
   one or more programs, wherein the one or more programs are stored in the memory and configured to be executed by the one or more processors, the one or more programs including instructions that when executed by the one or more processors cause the system to:
   a. receive, at the one or more processors, a processed seismic image and an enhanced seismic image representative of a subsurface volume of interest;
   b. forward model, via the one or more processors, the processed seismic image and the enhanced seismic image to generate a first modeled dataset and a second modeled dataset;
   c. difference, via the one or more processors, the first modeled dataset and the second modeled dataset to create a residual dataset;
   d. filter, via the one or more processors, the first modeled dataset to generate an approximation of illumination;
   e. precondition, via the one or more processors, the residual dataset with the approximation of illumination to generate an adjoint source;
   f. back project, via the one or more processors, the adjoint source to determine a model update; and
   g. apply the model update to an earth model of the subsurface volume of interest.

7. A non-transitory computer readable storage medium storing one or more programs, the one or more programs comprising instructions, which when executed by an electronic device with one or more processors and memory, cause the device to:
   a. receive, at the one or more processors, a processed seismic image and an enhanced seismic image representative of a subsurface volume of interest;
   b. forward model, via the one or more processors, the processed seismic image and the enhanced seismic image to generate a first modeled dataset and a second modeled dataset;
   c. difference, via the one or more processors, the first modeled dataset and the second modeled dataset to create a residual dataset;
   d. filter, via the one or more processors, the first modeled dataset to generate an approximation of illumination;
   e. precondition, via the one or more processors, the residual dataset with the approximation of illumination to generate an adjoint source;
   f. back project, via the one or more processors, the adjoint source to determine a model update; and
   g. apply the model update to an earth model of the subsurface volume of interest.

* * * * *